United States Patent [19]

Koppelman

[11] 4,073,955

[45] Feb. 14, 1978

[54] APPARATUS AND METHOD FOR AGING LIQUOR

[75] Inventor: Edward Koppelman, Encino, Calif.

[73] Assignee: Koppelman & Goodman Enterprises, Encino, Calif.

[21] Appl. No.: 730,618

[22] Filed: Oct. 7, 1976

[51] Int. Cl.$^2$ .................... C12G 3/00; C12H 1/22
[52] U.S. Cl. .................... 426/422; 99/277.1; 99/277.2; 426/493
[58] Field of Search .......... 426/422, 493, 494, 592; 99/277.1, 277.2

[56] References Cited

U.S. PATENT DOCUMENTS

| | | | |
|---|---|---|---|
| 2,017,235 | 10/1935 | Drew | 99/277.1 |
| 2,088,337 | 7/1937 | Plume | 99/277.2 |
| 2,114,009 | 4/1938 | Ramsay | 99/277.1 |
| 3,021,780 | 2/1962 | Bobbe | 99/277.1 |

*Primary Examiner*—David M. Naff
*Attorney, Agent, or Firm*—Harness, Dickey & Pierce

[57] ABSTRACT

An apparatus and method for improving the aging of alcoholic liquors, whereby the liquor to be aged is placed in a char-lined container incorporating a char-coated manifold assembly therein, which is connected to a vapor recovery system. The liquor is moved relative to the char surfaces by agitation provided by the manifold assembly or by recirculation of the liquor through the container. The vapor recovery system is provided with pumping means for controlling the permeation rate and vaporization of the liquor entering the manifold assembly. Means are provided to remove any liquid that accumulates in the manifold system.

18 Claims, 6 Drawing Figures

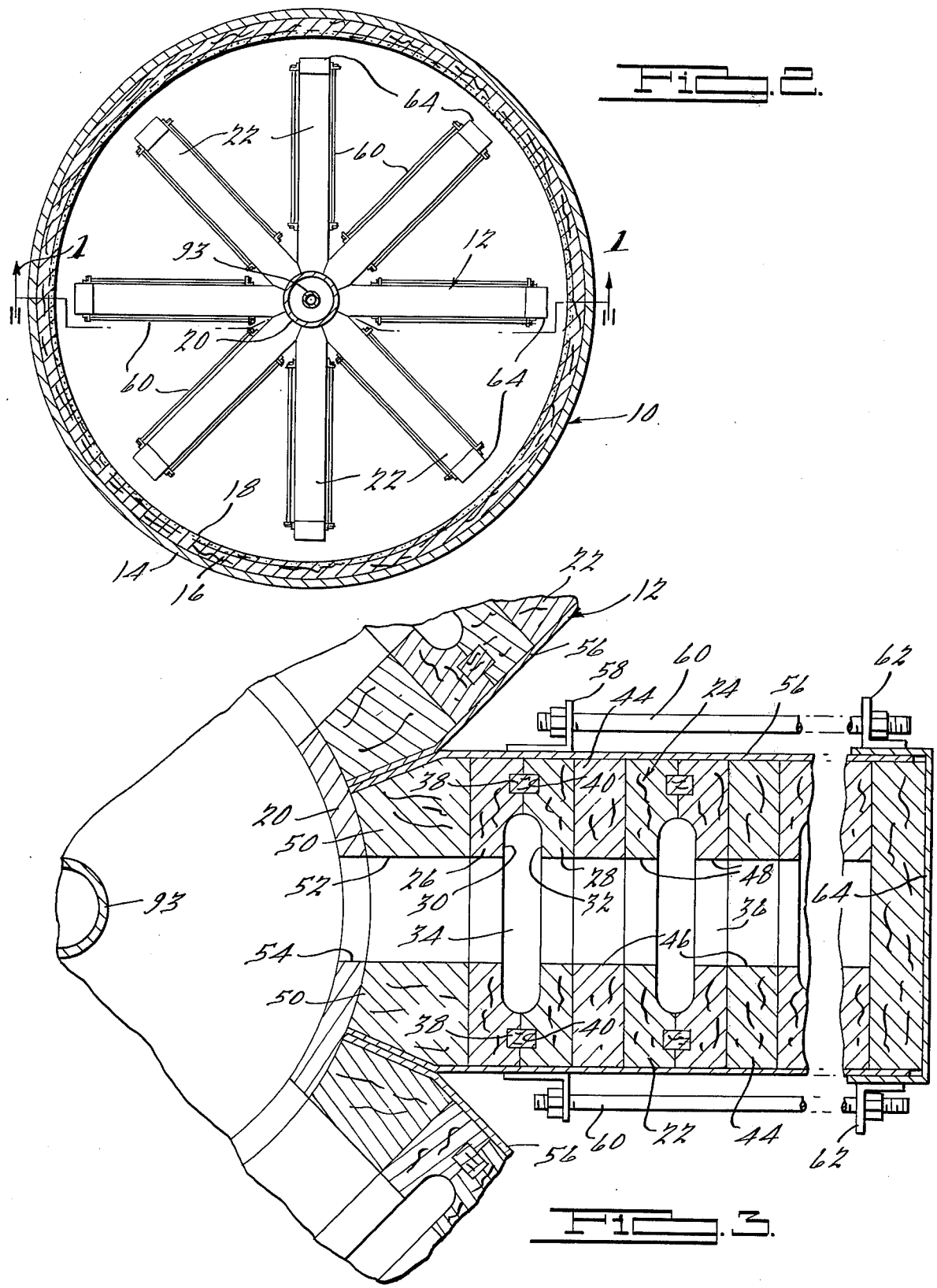

APPARATUS AND METHOD FOR AGING LIQUOR

BACKGROUND OF THE INVENTION

The practice of aging distilled alcoholic spirits or liquors to improve their bouquet, flavor and color is well known and in widespread use. Conventionally, such aging treatment is carried out by placing the new or unaged alcoholic spirits in wooden barrels provided with an internal charred surface, and thereafter placing the barrel in a warehouse maintained at a controlled ambient temperature for a period of years depending upon the specific type of distilled spirits and the governmental regulations applicable to provide a truly or fully aged liquor. Normally, the barrel is intermittently moved or rotated to prevent sections thereof from drying out and to provide agitation of the liquor therein. During the course of the aging treatment, the liquor permeates or diffuses into the wooden container, which undergoes "breathing" as a result of fluctuations in the ambient temperature within a relatively narrow range. Over prolonged aging periods, such as 4 years or more, for example, a substantial loss in the original unaged whiskey occurs as a result of evaporation of both water and alcohol as it diffuses through the wooden barrel, as well as that quantity of alcohol which becomes absorbed in the interstices of the wood and cannot be recovered at the conclusion of the aging process. Losses in amounts of about 15–20% or more are not uncommon over aging periods of about 4 years. Not only are such losses of valuable alcoholic spirits undesirable from a cost standpoint, but the dissipation of such spirits in the form of vapors in the warehouse constitutes a health and fire hazard to personnel.

Various attempts have heretofore been proposed to improve the method of effecting a full aging of alcoholic distilled spirits, including various devices for increasing the efficiency and/or effectiveness of the aging treatment. Exemplary of such new devices and techniques are those disclosed in U.S. Pat. Nos. 864,896; 2,017,235; 2,114,009; 2,586,133; 2,657,629; and 3,372,633. Apparatuses and techniques as disclosed in the aforementioned United States patents have not been successful for one or a number of reasons in reducing the warehousing costs associated with the aging process and the loss of valuable spirits over the aging period. In addition to the foregoing techniques, attempts have also been made to increase the effectiveness of the aging treatment by increasing the area of charred wood exposed to contact by the distilled alcoholic spirits, such as by introducing a quantity of charred wood chips or flakes into the barrels, by using grooved charred sticks, by using charred wooden baffles, and the like. While certain benefits have been realized as a result of such deviations from conventional barrel-type aging processes, the magnitude of such advantages are frequently more than offset by the costs and other problems introduced by such modifications, thereby discouraging widespread adoption of such techniques.

The apparatus and method of the present invention overcomes many of the problems and disadvantages associated with prior art techniques employed for effecting a full or true aging of distilled alcoholic spirits by materially reducing size requirements of a warehouse for aging a given volume of liquor, by recovering and recirculating volatilized constituents formed during the aging process, by increasing the efficiency of the aging treatment providing for improved aged liquors, and by substantially reducing the costs in labor and equipment for effecting a full or true aging of alcoholic spirits.

SUMMARY OF THE INVENTION

The benefits and advantages of the present invention are achieved in accordance with its apparatus aspects by a device including a liquid-tight receptacle having a charred wood lining or layer over at least a portion of the interior surface thereof disposed in contact with the liquor to be aged, a manifold assembly mounted in the receptacle at a position wherein it is at least partially submerged in the liquor, and agitation means for effecting relative movement between the liquor in the receptacle and the charred wooden surfaces of the receptacle and manifold assembly. In accordance with a preferred embodiment of the present apparatus, the manifold assembly comprises a framework including a central manifold tube incorporating a concentric internal vertical tube and a plurality of radially extending manifold arms thereon, between which a plurality of wooden conduits extend in supported relationship and are disposed with the interior thereof in interconnected communication with the manifold arms and manifold tube. The exterior surfaces of the wooden conduit are provided with a char coating or layer, through which the liquor diffuses or permeates through the underlying uncharred or virgin wood and enters the internal channels of the wooden conduit. The manifold assembly is connected to a vapor recovery system in which the vaporized constituents of the alcoholic liquor can readily be condensed and recovered and returned, if desired, to the container. A central tube located within the rotatable manifold tube is provided to allow liquid to be removed from the manifold system. The vapor recovery system may also incorporate a pumping device for applying a selected pressure or vacuum to the manifold system, effecting thereby a controlled variation in the breathing characteristics of the liquor. The container may further include heat transfer coils for controlling the temperature of the liquor within relatively narrow ranges during the course of the aging process.

Agitation of the liquor relative to the char surfaces is effected by moving the manifold assembly, or alternatively, by employing supplemental agitation means, either directly immersed in the liquor or by employing a pump for recirculating the liquor through the container.

In accordance with the method aspects of the present invention, an improved aging of alcoholic liquors is achieved by confining the liquor to be aged in a liquid-tight container which is provided with a manifold assembly comprising a plurality of char-coated wooden conduits submerged in the liquor. The interior of the conduits is connected to a manifold system and by controlling the pressure of the fluid within the manifold system, a controlled diffusion or permeation or "breathing" of the liquor through the char layer of the wooden conduits is effected, achieving thereby a controlled aging process. The method further includes withdrawing and recovering the vapors entering the manifold system and condensing and recovering the valuable constituents therein. The process further includes relatively moving the liquor and the char surfaces so as to assure uniform contact of the liquor and the undesirable constituents therein with the char layer to effect their elimination in the course of the aging process, whereby improved color, bouquet, flavor and taste of the aged liquor is effected.

Further benefits and advantages of the present invention will become apparent upon a reading of the description of the preferred embodiments taken in conjunction with the accompanying drawings.

BRIEF DESCRIPTION OF THE DRAWINGS

FIG. 2 is a horizontal transverse sectional view through the receptacle as shown in FIG. 1, and taken substantially along the line 2—2 thereof;

FIG. 3 is a fragmentary enlarged sectional view of the center manifold tube and manifold assembly taken along the line 3—3 of FIG. 1;

DESCRIPTION OF THE PREFERRED EMBODIMENTS

Figure 1:
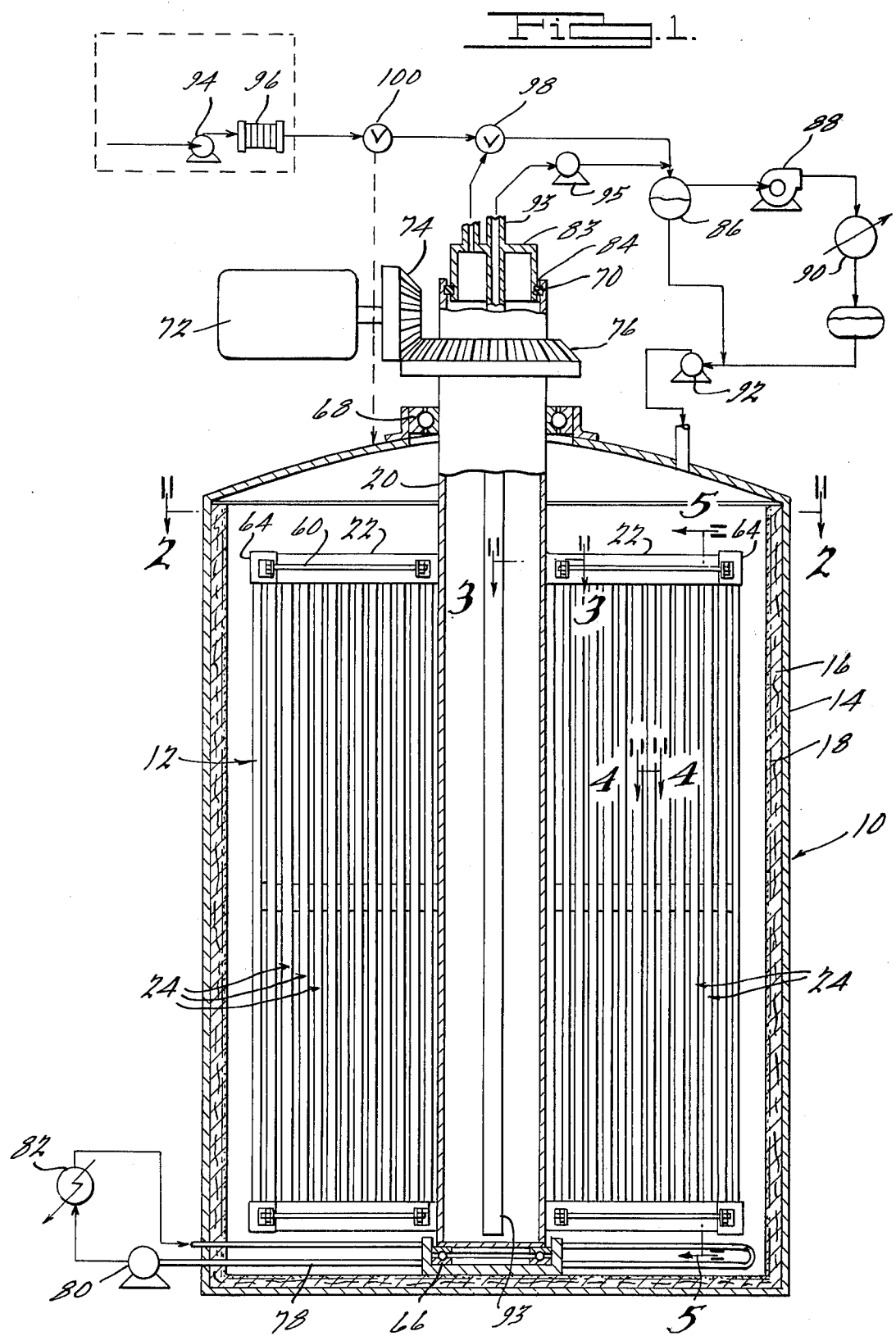
FIG. 1 is a vertical transverse sectional view, partly schematic, and taken along the line 1—1 of FIG. 2.

Referring now in detail to the drawings, and as may be best seen in FIGS. 1 and 2, the apparatus for improving the aging of distilled alcoholic spirits comprises a liquid-tight receptacle or tank 10 having a rotary manifold assembly 12 rotatably supported therein for rotation about a vertical axis. The receptacle 10 is of a generally circular transverse configuration and the peripheral portions of the manifold assembly 12 are disposed in spaced clearance relationship from the inner surface of the container. In the specific embodiment shown, the container 10 is of a composite construction comprising an outer shell or liner 14 comprised of stainless steel or other impermeable corrosion resistant high strength material and an inner wood liner 16 extending over substantially the entire inner side wall and bottom surface of the shell. The wooden liner 16 is removably affixed to the inner surfaces of the shell to enable replacement with freshly charred virgin wood at the conclusion of each aging cycle as may be desired or required by governmental regulations in order to comply with the requirements for producing a fully or truly aged liquor. The wooden liner 16 may be omitted in such situations where regulations and/or specifications regarding aging of alcoholic spirits permit, whereby the entire aging is effected by the manifold assembly 12.

The wooden liner 16 may be comprised of any wood normally employed for the aging of alcoholic spirits and preferably is composed of a virgin white oak which is charred on the inner surface thereof disposed in contact with the liquor to provide a char layer 18 of a depth up to about 1/32 inch or more. The longitudinal edges of each of the boards or planks defining the wooden liner 16 are preferably provided with an interfitting tongue-and-groove configuration to further facilitate retention of the liner in appropriate position within the shell over the duration of the aging treatment.

The manifold assembly 12, as best seen in FIGS. 1-5, comprises a central tube or manifold tube 20, to the upper and lower end portions of which a plurality of manifold arms 22 are secured and extend radially therefrom to a position disposed in clearance relationship relative to the interior of the container. The manifold arms 22 in each tier are arranged in vertically aligned relationship and a plurality of wooden conduits or hollow staves 24 extend between and are connected at their ends to the manifold arms.

Figure 4:
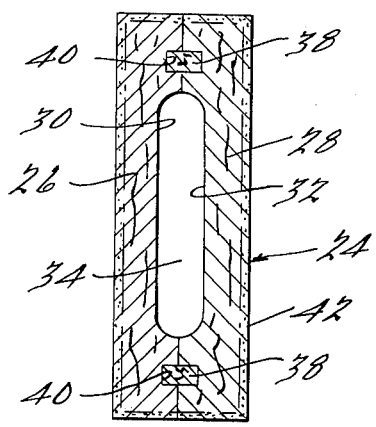
FIG. 4 is a magnified transverse sectional view of a wooden conduit or stave of the rotary manifold assembly shown in FIG. 1 and taken substantially along the line 4—4 thereof.

Each wooden conduit 24, as best seen in FIGS. 3 and 4, comprises a pair of members 26, 28 formed with a groove 30, 32 extending longitudinally along the opposed inner faces thereof, respectively, defining in combination a channel 34 which is disposed at its upper and lower ends in communication with a radial channel 36 in the manifold arms. The members 26, 28, defining the wooden conduit 24, are retained in appropriate opposed relationship by means of elongated splines 38 of a rectangular cross sectional configuration seated in engaged relationship within opposed grooves 40. The outer surface of each of the wooden conduits 24 disposed outwardly of the manifold arms is provided with a char layer 42 of a depth corresponding to that conventionally employed on the inner surface of oak barrels or casks in accordance with the usual liquor aging process.

The individual wooden conduits 24 are disposed in radially spaced relationship providing gaps and are maintained in such appropriate position by means of rectangular spacer blocks 44 interposed between adjacent wooden conduits in a manner as best seen in FIG. 3. The spacer blocks are formed with a transverse bore 46 disposed in alignment with a transverse bore 48 through the upper portions of the wooden conduits defining in combination the radial channel 36 of the manifold arm. The innermost wooden conduit is positioned against a transition block 50 having its inner end disposed in abutting relationship against the periphery of the central tube 20 and is provided with a bore 52 in alignment with a bore 54 through the wall of the tube, providing communication of the radial channel 36 with the interior of the central tube.

Figure 5:
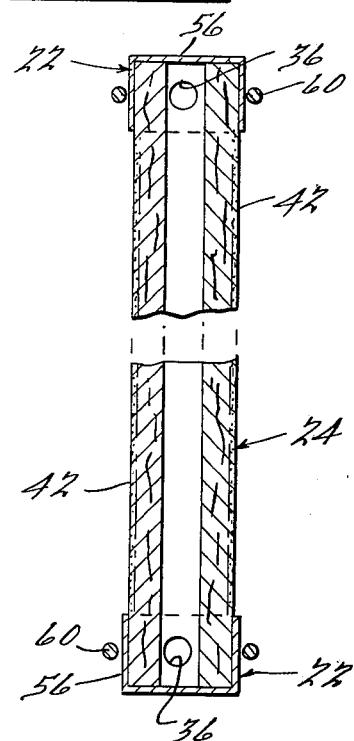
FIG. 5 is a magnified fragmentary longitudinal sectional view through a wooden conduit as shown in FIG. 1 and taken substantially along the line 5—5 thereof.

The adjacent surfaces of the wooden conduits and spacer blocks are maintained in appropriate abutting relationship by means of a U-shaped stainless steel sheet 56, as best seen in FIGS. 3 and 5, which overlies the side surfaces and the end edges of the wooden conduits. The inner portion of the sheath 56 is provided with an L-shaped bracket 58 for receiving a threaded tie rod 60, which extends radially along one side face of the manifold arm and is adjustably secured at its opposite end or outer end to a bracket 62 secured to a cap 64 overlying the outermost wooden conduit. Appropriate tightening of the tie rods maintains the assembly and sheath in appropriate relative disposition.

The entire manifold assembly 12 is rotatably supported within the interior of the tank 10 by means of a bearing assembly 66 at the lower end of the central tube, which is supported by the base of the tank. An upper bearing assembly 68 rotatably supports the upper end portion of the central tube. In the specific embodiment as shown in FIG. 1, continuous or intermittent rotation of the manifold assembly is effected by means of an electric motor 72 having a drive pinion 74 on its output shaft, which is disposed in meshing relationship with a bevel driven gear 76 affixed to the central tube. The drive arrangement is controlled so as to provide for a relatively slow rotation of the manifold assembly, such as in the order of about one to about 12 revolutions per hour. The rotating movement of the manifold assembly including the longitudinally extending wooden conduits or hollow staves thereon causes a gentle agitation of the liquor in the container, assuring uniform contact with the charred surfaces and avoiding any stagnant areas. The total charred exterior surfaces of the wooden conduits of the manifold assembly are preferably controlled so as to provide a surface area per unit volume of liquor corresponding to that of a conventional oak barrel or cask. By virtue of the foregoing, an aging of the liquor is effected employing the apparatus as shown in a manner similar to that obtained in the use of conventional whiskey aging barrels, but in a more efficient manner, requiring less labor and warehouse space, and at the same time providing for a recovery of the vapors liberated during the aging process.

The provision of the hollow staves or wooden conduits permits the apparatus to "breathe" in a manner substantially identical to that which occurs in a conventional wooden aging barrel. Further control of the breathing characteristics of the apparatus is achieved by controlling the temperature of the liquor and the pressure in the receptacle and/or in the interior channels of the manifold assembly. As shown in FIG. 1, a heat transfer element 78 is disposed at a position spaced upwardly of the base of the receptacle and in contact with the liquor therein to effect a controlled heating or cooling thereof to maintain the contents within a desired temperature range. A suitable liquid heat transfer media is circulated through the heat transfer element 78 by means of a pump 80, causing the fluid to pass through a heat exchanger 82 exteriorly of the receptacle.

The application of a vacuum or subatmospheric pressure to the interior channels of the manifold assembly, effecting a withdrawal of vapors passing through the char layer and wooden substrate of the wooden conduit, is effected by means of a vapor recovery system connected by a stationary coupling 83 to the outlet end of the central tube, as best seen in FIG. 1, by means of a slip connection or rotary joint 84 incorporating a seal member 70. The vapor recovery system includes a vapor-liquid separator 86, the upper end of which is connected to a vacuum pump 88 having its discharge side connected to a vapor condenser 90 to effect a condensation and recovery of the water-alcohol mixture. The condensed water-alcohol mixture is conveniently combined with the liquid portion recovered in the vapor-liquid separator 86 and is returned by means of a pump 92 to the interior of the tank 10 in accordance with the flow diagram schematically shown in FIG. 1.

A vertical tube 93 is disposed within and extends downwardly of the manifold tube 20 to a position where its lower end is disposed adjacent to the base thereof. The upper end of the vertical tube 93 is supported by and extends through the stationary coupling 83. The upper portion of the vertical tube 93, as schematically illustrated in FIG. 1, is connected to the suction side of a liquid pump 95, which is in turn connected at its discharge side to the vapor-liquid separator 86. The provision of the vertical tube 93 and the pump 95 is effective to remove any liquid accumulation from the interior of the manifold assembly as occasioned by condensation and/or leakage and/or seepage so as to prevent any appreciable flooding of the lower portion thereof. The pump 95 is energizable to effect a removal of liquid through the tube 93 in response to a suitable liquid level sensing device of any of the types well known in the art. The accumulated liquid thus withdrawn from the lower portion of the manifold assembly is again returned to the container from the base of the vapor-liquid separator by the pump 92.

It is also contemplated that the interior channels of the manifold assembly can be pressurized to cause a reversal in the direction of the normal direction of breathing from the liquid side to the vapor side of the hollow staves. This is conveniently achieved in accordance with the optional pressurizing system as schematically illustrated in FIG. 1 by employing a gas compressor 94 having its discharge side connected to a gas filter 96, which in turn is connected to the upper end of the central conduit. A suitable selector valve 98 can be incorporated at the juncture of the vapor recovery vacuum system and optional gas pressurizing system for selectively connecting the respective system to the interior of the manifold assembly. It is also contemplated that the vacuum and gas pressurizing systems can be operated in a preselected alternative sequence so as to increase the breathing characteristics of the manifold assembly and to further enhance the aging characteristics of the apparatus.

It is also contemplated that the gas pressurizing system can be connected through a suitable selector valve 100 to the interior of the container, whereby the differential pressure between the liquid side and vapor side of the hollow staves can be further increased to accelerate the diffusion and/or breathing characteristics of the liquor.

In the embodiments as previously described in connection with FIGS. 1-5, relative movement of the liquor with respect to the hollow staves is achieved by a controlled rotation of the manifold assembly. It is also contemplated that the manifold assembly can be retained in a stationary position and relative movement of the liquor can be effected by a propeller or paddle-type agitator (not shown) submerged in the liquor to be aged. Alternatively, relative movement of the liquor and the char surfaces of the receptacle and manifold assembly can be effected in accordance with the arrangement as illustrated in FIG. 6, in which an external liquid circulation system is schematically illustrated.

Figure 6:
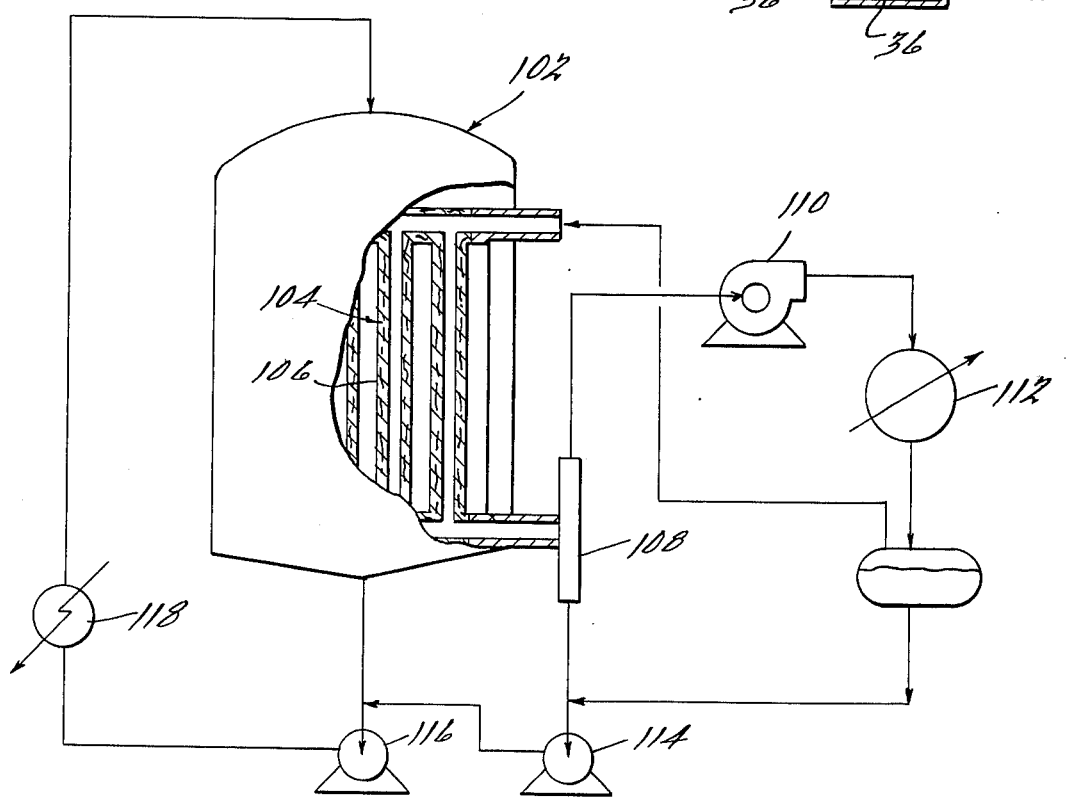
FIG. 6 is a side elevational view, partly schematic, and with portions thereof broken away, illustrating an alternative satisfactory embodiment of the apparatus of the present invention.

As shown in FIG. 6, a container 102 having the same structural features as the container 10 previously described, is provided with a manifold assembly 104, which is stationarily mounted therein. The manifold assembly incorporates a plurality of hollow staves or wooden conduits 106 positioned either in a vertical or horizontal arrangement, and the interior thereof is suitably connected to a liquid-vapor separator 108, the upper portion of which is in turn connected to a vacuum pump 110. The vapor recovery system is similar to that previously described, and includes a vapor condenser 112 for condensing the recovered water-alcohol mixture with the liquid portion thereof being combined with the liquid withdrawn from the liquid vapor separator 108 and returned through a pump 114 into the inlet side of the liquor recirculation pump 116. The liquid recirculation system, including the pump 116, may further include a heat exchanger 118 to maintain the liquor within the prescribed temperature range during the aging process. In the specific embodiment as schematically shown in FIG. 6, the liquor is withdrawn from the base of the receptacle 102 and is returned into the upper end portion thereof.

The liquor aging process can be carried out for different time periods depending upon the different types of distilled spirits being aged and whether a full or truly aged liquor conforming with governmental specifications is desired. The quantity of surface area of the charred manifold systems and the interior walls of the container can be proportionately increased, if desired, to provide for an accelerated aging treatment in comparison to that achieved employing conventional charred oak barrels, as may be desired.

While it will be apparent that the invention herein disclosed is well calculated to achieve the benefits and advantages hereinabove set forth, it will be appreciated that the invention is susceptible to modification, variation and change without departing from the spirit thereof.

What is claimed is:

1. An apparatus for aging distilled alcoholic spirits comprising means defining a liquid-tight container adapted to be filled with the liquor to be aged, a manifold assembly mounted in said container and adapted to be at least partially submerged in the liquor, said manifold assembly comprising a framework incorporating a manifold including a plurality of substantially liquid-tight wooden conduits supported on said framework and having the interior channels thereof disposed in interconnected communication, at least a portion of the exterior surfaces of said wooden conduits provided with a charred coating thereover adapted to be disposed in contact with the liquor to be aged, a vapor recovery system connected to said manifold for receiving the vapors entering into said manifold assembly and effecting a recovery thereof, and means for producing relative movement between the liquor in said container and the char coating on said wooden conduits.

2. The apparatus as described in claim 1, further including a charred wooden lining over at least a portion of the interior surface of said container.

3. The apparatus as described in claim 1, in which said means for producing relative movement between the liquor in said container and the char coating on said wooden conduit is achieved by agitation means in said container for effecting movement of the liquor therein.

4. The apparatus as described in claim 1, further including circulation means disposed exteriorly of said container for withdrawing a portion of the liquor therein for recirculation back to the interior of the container in a manner to produce relative movement between the liquor and the char coating on said wooden conduits.

5. The apparatus as described in claim 1, further including means for rotatably mounting said manifold assembly in said container, and drive means for effecting rotation of said manifold assembly to produce relative movement between the liquor and the char coating on said wooden conduits.

6. The apparatus as described in claim 1, further including a drain conduit disposed interiorly of said manifold assembly and pumping means in communication with said drain means for effecting extraction of liquid from the interior of said manifold assembly.

7. The apparatus as described in claim 1, further including heat transfer means for controlling the temperature of the liquor to be aged within a preselected temperature range during the aging process.

8. The apparatus as described in claim 1, in which said vapor recovery system further includes condensing means for condensing at least a portion of the vapors received into liquid and means for returning at least a portion of the condensed liquid to said container in admixture with the liquor to be aged therein.

9. The apparatus as described in claim 1, further including means connected to the interior of said manifold assembly for applying a pressure of a preselected magnitude thereto.

10. The apparatus as described in claim 1, further including means disposed in communication with the interior of said manifold assembly for applying a preselected subatmospheric pressure thereto.

11. The apparatus as described in claim 1, further including means disposed in communication with the interior of said manifold assembly for applying a preselected superatmospheric pressure to the interior thereof.

12. The apparatus as described in claim 1, further including means disposed in communication with the interior of said manifold assembly for alternatively applying a subatmospheric and a superatmospheric pressure thereto in a prescribed sequential timed sequence.

13. The apparatus as described in claim 1, in which said manifold assembly comprises a framework consisting of a pair of spaced networks comprised of a plurality of radially extending arms and wherein said wooden conduits are mounted and extend between respective arms of said pair of networks and mounted with the interior thereof disposed in communication with the interior of said arms.

14. A process for aging distilled alcoholic spirits which comprises the steps of introducing liquor to be aged into a liquid-tight container, submerging in the liquor a manifold assembly including a plurality of substantially liquid-tight wooden conduits provided with charred exterior coatings and having interconnected interior channels, relatively moving the liquor in the container and the char coating on the wooden conduits, extracting and recovering the vapors entering the interior channels of said wooden conduits and continuing the aging treatment for a period of time sufficient to effect an improvement in the flavor of the distilled alcoholic spirits.

15. The process as defined in claim 14, including the further step of controlling the temperature of the liquor during the aging treatment within a prescribed temperature range.

16. The process as defined in claim 14, including the further step of condensing at least a portion of the vapors extracted into liquid and returning at least a portion of the condensed liquid back into the container and in admixture with the alcoholic spirits being aged.

17. The process as defined in claim 14, including the further step of controlling the pressure within the interior channels of said wooden conduits to control the direction and magnitude of diffusion of the liquor through the walls of the wooden conduits.

18. The process as defined in claim 14, including the further step of alternatively applying a subatmospheric pressure and a superatmospheric pressure to the interior channels of said wooden conduits in a manner to regulate the diffusion of liquor into the interior channels of said conduits.

* * * * *